June 24, 1930.  H. THOMPSON  1,765,637
COOLING SYSTEM FOR MARINE ENGINES
Filed Jan. 24, 1928  2 Sheets-Sheet 1
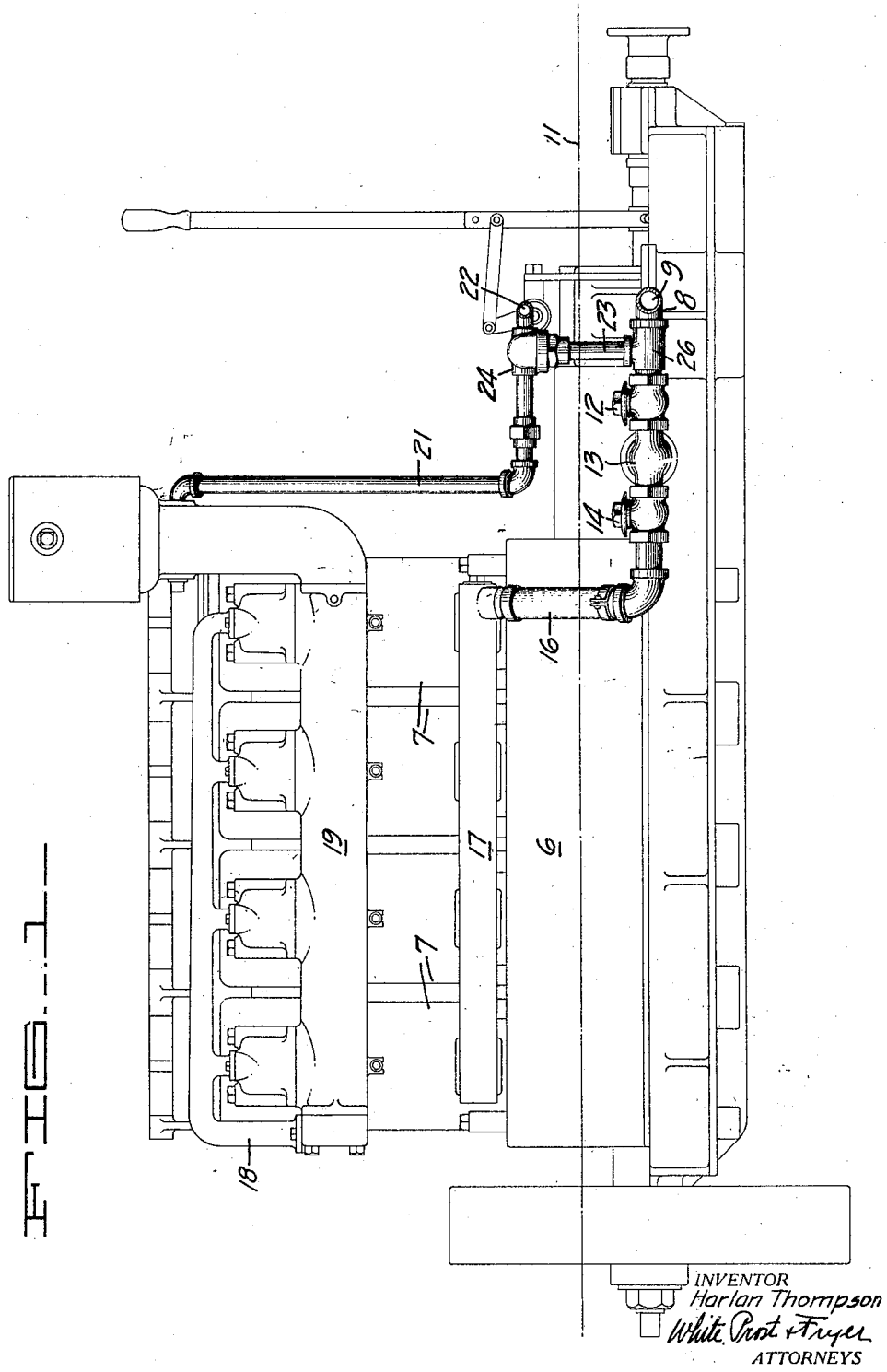
INVENTOR
Harlan Thompson
ATTORNEYS

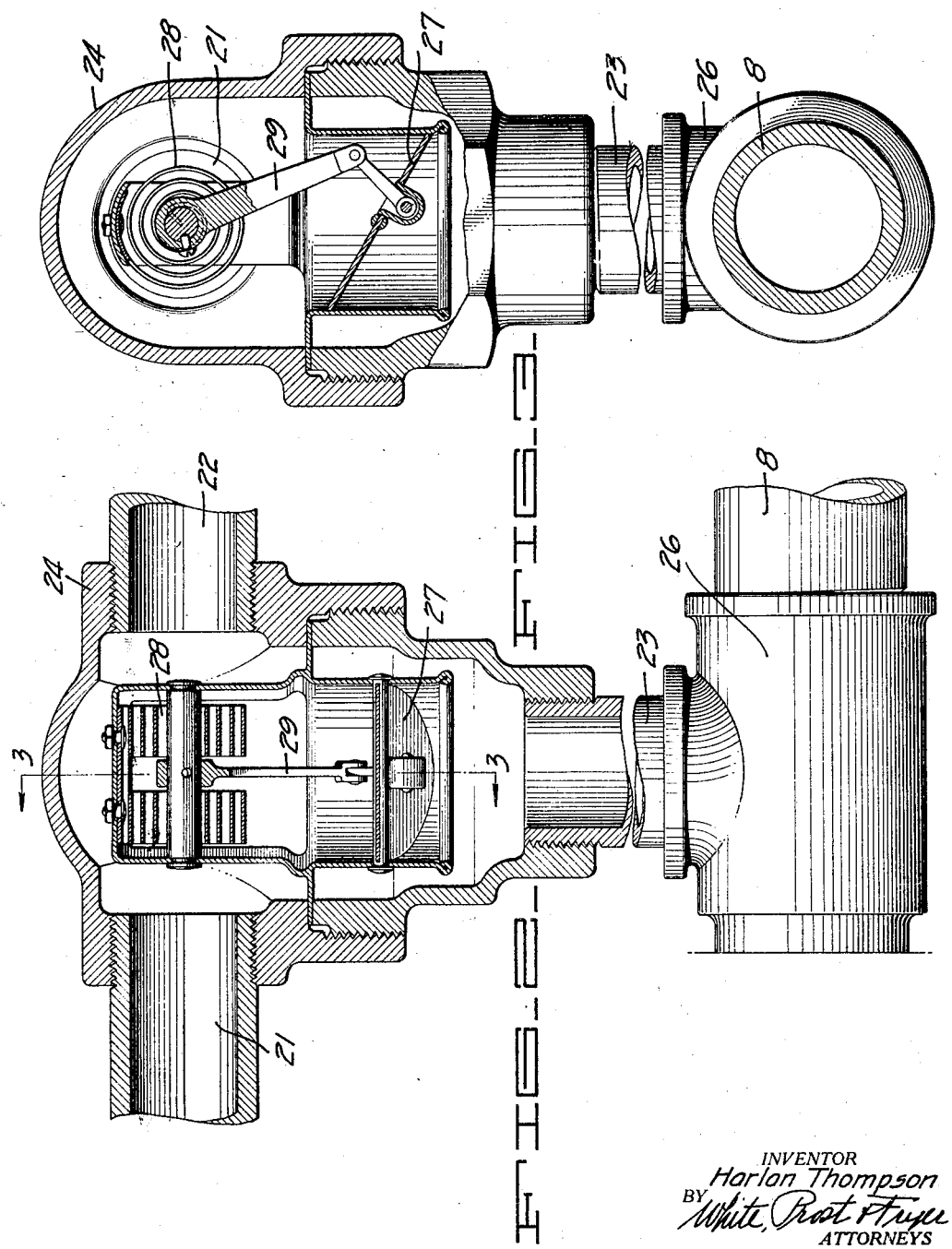

Patented June 24, 1930

1,765,637

UNITED STATES PATENT OFFICE

HARLAN THOMPSON, OF BENICIA, CALIFORNIA, ASSIGNOR TO YUBA MANUFACTURING COMPANY, OF SAN FRANCISCO, CALIFORNIA, A CORPORATION OF CALIFORNIA

COOLING SYSTEM FOR MARINE ENGINES

Application filed January 24, 1928. Serial No. 249,191.

My invention relates to the means employed for cooling internal combustion engines especially adapted for marine use and is especially concerned with the control of the cooling water.

While considerable progress has been made in the development of suitable cooling systems for internal combustion engines used in automotive practice, and while such systems have been carefully designed to give the requisite results, there has been considerably less attention paid to this phase of marine engine design and considerable difficulty is at present experienced in cooling marine engines properly. It is usually the custom in marine engine design, particularly in smaller units, to induct cooling water from the sea and pump it thru the engine cooling jacket to absorb the excess heat. Water which has passed thru the jacket is then discharged overboard. When such a system is properly designed, it operates admirably under relatively constant conditions but if it is used where the sea water varies considerably in temperature from that for which the system was designed, the engine is prone to run too hot or entirely too cold. Furthermore, the usual systems are not conducive to rapid warming up of the engine from cold condition.

It is an object of my invention to provide a cooling system for marine engines which aids the warming up of the engine.

Another object of my invention is to provide a cooling system which will maintain substantially the desired engine temperature despite fluctuations in temperature of the sea water used for cooling.

My invention possesses other advantageous features, some of which with the foregoing will be set forth at length in the following description where I shall outline in full that form of the cooling system of my invention, which I have selected for illustration in the drawings accompanying and forming part of the present specification. In said drawings I have shown one form of the cooling system for engines embodying my invention, but it is to be understood that I do not limit myself to such form since the invention, as set forth in the claims, may be embodied in a plurality of forms.

In the drawings:

Fig. 1 is a side elevation of a marine engine equipped with the cooling system of my invention.

Fig. 2 is an enlarged detail of a portion of the system, parts being shown in cross section.

Fig. 3 is a view similar to Fig. 2, the plane of section being indicated by line 3—3 of Fig. 2.

In its preferred form, the cooling system for marine engines of my invention preferably comprises an inlet to the engine jacket for sea water and an outlet to the sea from the engine jacket together with a by-pass between the inlet and the outlet to allow local circulation in the system for use when the engine temperature is lower than the desired value.

It might appear at first glance that the conventional systems used in automobile engine cooling could easily be adapted for use with marine engines but closer inspection reveals that the problems presented are materially different. In the usual automobile design there is provided an inlet from the radiator to the engine and an outlet from the engine to the radiator comprising a closed system for the circulation of cooling water. The engine and radiator are substantially on the same level so that thermo-syphon circulation of the cooling water can take place whether or not a force pump is provided. Thermo-syphon circulation is inherently responsive to the heat conditions in the engine as an excess of heat causes a relatively rapid circulation of the cooling water thruout the system while a deficiency in engine heat is not effective to cause an appreciable circulation. This scheme in most respects is almost ideal but when an attempt is made to apply it to a marine engine it is found that additional factors must be considered. For instance, the water intake to the engine is usually below the level of the sea while the water outlet from the engine is considerably above the level of the sea. For that reason there is no head between the outlet and the inlet, corresponding to the head in an automobile radiator, to provide a closed circuit and to balance the head within the engine jacket. Thermo-syphon circulation is out of the question with a marine engine equipped in accordance with usual practice.

In the preferred embodiment of my invention disclosed in the drawings, the marine engine 6 is suitably installed and is provided with jackets 7 for cooling water. These jackets surround the engine cylinders of which four are shown. As is customary, water is supplied to the engine thru an inlet conduit 8 having an entrance 9 below the level of the sea 11. The conduit 8 leads thru a check valve 12 to a force pump 13 suitably connected to the engine and adapted to be driven thereby in the well known manner. The discharge from the pump passes thru a check valve 14 and thru a pipe 16 to a manifold 17 leading to the jackets 7. The check valves 12 and 14 are both provided to pass water from the inlet conduit 8 to the engine but not in a reverse direction. The cooling water absorbs the engine heat as it flows thru the jackets and is expelled therefrom into a header manifold 18 leading thru the engine exhaust pipe 19 to an outlet conduit 21 leading overboard. The exit 22 of the outlet 21 is preferably materially above the level of the sea 11.

The system as so far described is largely in accordance with standard practice in which the pump 13 receives water thru the inlet 8 and forces it thru the balance of the system to absorb the heat from the engine jackets 7 and discharge the heated water overboard thru the outlet 21. As mentioned above, such a system is not capable of supporting thermo-syphon action for cooling the cylinders and, since the size and speed of the pump are usually fixed, tends to pump either an excess or a deficiency of water thru the engine except when the operation is exactly in accordance with the theoretical conditions for which the system was designed. Inasmuch as the pump begins to circulate water thru the system immediately upon the starting of the engine, it maintains a current of relatively cold water passing thru all of the jackets 7 during the warming up period of the engine and deleteriously absorbs the heat during such time. Furthermore, the water entering the inlet 8 is at a fixed low temperature in distinction to the inlet water temperature in a closed automobile system which usually rises materially during the warming up period of the engine.

To overcome the difficulties mentioned hereinabove, I preferably provide a by-pass 23 connected in the outlet 21 by a T 24 and connecting with the inlet 8 by a similar T 26. Controlling fluid flow thru the by-pass 23 and preferably mounted in the fitting 24 is valve 27 effective to close entirely the passage thru the by-pass or to permit it to remain entirely open. For manipulating the valve I preferably provide a thermostat 28 connected by suitable linkage 29 to the valve and arranged to open the valve when the temperature of the water flowing by the thermostat is relatively low and to close the valve 27 to block the by-pass 23 when the temperature of the water flowing thru the outlet 21 is relatively high.

When a by-pass 23 is provided in accordance with my invention it is possible for water to circulate within the jacket 7 and from the outlet 21 thru the by-pass 23 back into the inlet 8 thereby effecting a thermo-syphon circulation in a local circuit to permit the engine to become warmed up rapidly and to operate at the requisite temperature. Thus substantially no cold sea water enters at 9 as will hereinafter be described, so the engine heat is not continually being dissipated to an ever-changing stream of water.

This condition may be enhanced by regulating the resistance of the exit 22 somewhat in accordance with the height of the exit with respect to the engine jackets 7 and can easily be effected by convolutions in the pipe, by restricting the pipe diameter or by increasing the pipe length. Further, the check valves 12 and 14 are usually sufficiently sensitive to permit circulation past the pump when the pump is not operated by the engine.

In describing the operating of the device it will be assumed that the engine is being started from cold and that consequently the thermostat 28 has opened valve 27. When the engine commences firing the pump 13 is effective to draw water not only from the ocean thru entrance 9 but also from by-pass 23. Due to the relatively large head on the water in the by-pass 23 and due somewhat to the resistance of the exit 22 and also due to the suction of the pump 13 most of the water circulated when the valve 27 is opened is from the jacket 7 and the by-pass 23. This mode of operation continues until the water increases in temperature in consonance with increase in engine temperature whereupon valve 27 is partially or entirely closed by the thermostat 28 and water which has become warm by being passed thru the jackets 7 is discharged overboard from the exit 22. A proportion of the cooling water, ranging up to 100 per cent. depending upon the position of the valve 27, is then drawn from the inlet 8 rather than from the by-pass 23.

With the system described, when the engine is shut down the stoppage of pump 13 does not necessarily interfere with continued circulation of the water as the thermostat 28 cools relatively rapidly, being somewhat remote from the engine and well exposed to the atmosphere, and soon opens the valve 27. Thermo-syphon circulation which previously could not take place due to the absence of head between the exit 22 and the entrance 9 is initiated thru the closed circuit provided by the by-pass 23, the inlet 16, and the outlet 21. In this connection the pump 13 is preferably provided with its piston offset through inlet connections. The usually very sensitive check valves 12 and 14 are located, as has been previously mentioned, on each side of the pump connection. The water readily circulates past the pump and does not run out of the system at the inlet or outlet by reason of the fact that there is not sufficient head to force it out against the frictional resistance imposed by the pipe and let air back in to replace it. A substantially uniform temperature is thus maintained regardless of engine load, speed, or temperature of inlet sea water, since the recirculated warm water and the incoming cold sea water are properly proportioned to afford the desired temperature. The proportioning and the resultant temperature can be properly adjusted by suitably setting the thermostat valve.

I claim:

1. A cooling system for marine engines comprising means located below the sea level for supplying sea water to the jackets of said engine, an outlet to the sea above the level thereof for the water from said jackets, a by-pass from said outlet to said supplying means, and a valve in said by-pass for controlling water flow therethrough.

2. A cooling system for marine engines having jackets substantially above the level of the sea, an inlet for supplying sea water to the jackets of said engine, the entrance to said inlet normally being below the level of the sea, an outlet to the sea for the water from said jackets, the exit from said outlet normally being above the level of the sea whereby thermo-syphon flow through said system is precluded, and a by-pass between said outlet and said inlet for permitting thermo-syphon flow through said system.

3. A cooling system for marine engines having water jackets substantially above the level of the sea, an inlet for supplying sea water to the jackets of said engine, the entrance to the inlet being below the level of the sea, an outlet for water from said jackets, the exit from the outlet being above the level of the sea whereby thermo-syphon flow through the system is precluded, a by-pass connection between the outlet and the inlet to provide for the thermo-syphon flow through the system, and a thermal responsive valve means in the by-pass for controlling the flow of water therethrough.

4. A cooling system for marine engines comprising an inlet connection below the sea level for supplying cooling water to the engine, an outlet to the sea above the level thereof for water from the engine, a by-pass connection from the outlet connection to the inlet connection, a thermal responsive valve means located in the by-pass connection, a plurality of check valves in the inlet connection, and pumping means cooperating with the inlet connection, said pumping means being located between the check valves for receiving water supply from the inlet and the by-pass connections.

In testimony whereof, I have hereunto set my hand.

HARLAN THOMPSON.